United States Patent
Park et al.

(10) Patent No.: US 8,670,417 B2
(45) Date of Patent: Mar. 11, 2014

(54) METHOD AND APPARATUS FOR RETRANSMISSION

(75) Inventors: Jisoo Park, Daejeon (KR); Namsuk Lee, Daejeon (KR); Sook Jin Lee, Daejeon (KR); Yong Seouk Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 495 days.

(21) Appl. No.: 12/914,453

(22) Filed: Oct. 28, 2010

(65) Prior Publication Data

US 2011/0096768 A1    Apr. 28, 2011

(30) Foreign Application Priority Data

Oct. 28, 2009  (KR) .................. 10-2009-0102849
Nov. 4, 2009   (KR) .................. 10-2009-0105834
Oct. 28, 2010  (KR) .................. 10-2010-0105926

(51) Int. Cl.
*H04B 7/216* (2006.01)

(52) U.S. Cl.
USPC ........................................... 370/335

(58) Field of Classification Search
None
See application file for complete search history.

(56) References Cited

U.S. PATENT DOCUMENTS

| 2009/0181689 | A1* | 7/2009 | Lee et al. ............. 455/450 |
| 2009/0276676 | A1 | 11/2009 | Lee et al. |
| 2010/0074211 | A1 | 3/2010 | Kim et al. |
| 2010/0199140 | A1 | 8/2010 | Lee et al. |
| 2010/0211845 | A1 | 8/2010 | Lee et al. |

FOREIGN PATENT DOCUMENTS

| KR | 10-2008-0030941 | 4/2008 |
| KR | 10-2009-0005467 | 1/2009 |
| KR | 10-2009-0078723 | 7/2009 |
| KR | 10-2009-0078724 | 7/2009 |
| KR | 10-2009-0078727 | 7/2009 |
| KR | 10-2009-0078731 | 7/2009 |
| KR | 10-2009-0114802 | 11/2009 |

* cited by examiner

*Primary Examiner* — John Blanton
(74) *Attorney, Agent, or Firm* — Staas & Halsey LLP

(57) ABSTRACT

Provided is a method for retransmission in a terminal and a base station, the method including: receiving a data burst transmitted by occupying at least one subframe from the other one of the terminal and the base station; determining a transmission timing for transmitting a feedback signal based on a value, determined by transmission information of the data burst including the number of subframes occupied by the data burst, and a frame offset; transmitting the feedback signal to the other one of the terminal and the base station at the transmission timing; and if an NACK message is included in the feedback signal, receiving the data burst retransmitted from the other one of the terminal and the base station.

12 Claims, 9 Drawing Sheets

METHOD AND APPARATUS FOR RETRANSMISSION

CROSS-REFERENCE TO RELATED APPLICATION

This application claims priority to and the benefit of Korean Patent Application No. 10-2009-0102849, 10-2009-0105834 and 10-2010-0105926 filed in the Korean Intellectual Property Office on Oct. 28, 2009, Nov. 4, 2009, and Oct. 28, 2010 the entire contents of which are incorporated herein by reference.

BACKGROUND OF THE INVENTION (a) Field of the Invention

The present invention relates to a method and apparatus for retransmission.

(b) Description of the Related Art

Among retransmission schemes, a Hybrid Automatic Repeat Request (HARQ) scheme is a combined transmission scheme of a Forward Error Correction (FEC) and an Automatic Repeat Request (ARQ) scheme. The HARQ scheme can be classified into a synchronous HARQ scheme and an asynchronous HARQ scheme according to the transmission timing of a retransmission packet. The synchronous HARQ scheme is a scheme in which a retransmission packet for an initial transmission packet is transmitted at a predetermined timing, which is applicable to uplink HARQ retransmission. The asynchronous HARQ scheme is a scheme in which a scheduler of a base station determines a transmission timing of a retransmission packet, which is applicable to downlink HARQ retransmission. The HARQ scheme may be classified into an adaptive HARQ scheme and a non-adaptive HARQ scheme according to changes in the amount and position of resources to be allocated. The adaptive HARQ is a scheme in which the amount and position of resources to be allocated can be changed. The non-adaptive HARQ is a scheme in which the amount and position of resources to be allocated are fixed. A wireless communication system can achieve a high scheduling gain and the effect of high speed data transmission by properly combining the synchronous and asynchronous HARQ schemes and the adaptive and non-adaptive HARQ schemes and using low signaling overhead.

Regarding a downlink (DL) HARQ operation in which a base station (BS) transmits a data burst in a downlink (DL), first of all, the base station transmits, to a terminal, control information including resource allocation information and an HARQ subpacket which is an encoded data burst. The control information may be included as an information element (IE) in a MAP. The MAP may be, for example, a Down Link Basic Assignment Advanced-MAP (DL B-A-A-MAP). The terminal having received the data burst decodes the data burst using the control information, and determines a transmission timing of a feedback signal and sends an ACK (positive acknowledgement) message or an NACK (negative acknowledgement) message to the base station.

Regarding an uplink (UL) HARQ operation in which a terminal (mobile station MS) transmits a data burst in an uplink (UL), the terminal receives control information including resource allocation information from a base station, and encodes the data burst using the received control information. After that, the terminal transmits an HARQ subpacket which is the encoded data burst to the base station at a predetermined transmission timing. At this point, the control information may be included in a MAP. The MAP may be, for example, an Up Link Basic Assignment Advanced-MAP (UL B-A-A-MAP). Then, the base station decodes the received data burst, and sends an ACK message or NACK message, as a feedback signal, to the mobile station. If the terminal receives the NACK message, the mobile station retransmits the data burst at a predetermined transmission timing.

A transmission time unit used in an HARQ operation is a Transmission Time Interval (TTI). The TTI is the duration of the transmission of the physical layer for a packet encoded over a radio air interface. The TTI is expressed as an integer number of subframes. For example, 1 TTI equals to an amount of time corresponding to one subframe. A data burst may be transmitted in at least one subframe. In general, the number of subframes occupied by the data burst can be denoted by TTI. The transmission of the data burst in one subframe is referred to as 1TTI transmission or default TTI transmission, and the transmission of the data burst on continuous subframes is referred to as long TTI transmission.

In this manner, the base station and the terminal determine a transmission timing according to a predetermined transmission timing determination method and perform their corresponding HARQ operation. Thus, even if there are enough resources, the corresponding HARQ operation has to be performed after waiting until a settled transmission timing is reached. Accordingly, the transmission timing of a feedback signal may be unnecessarily delayed depending on the method of determining a transmission timing.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a retransmission method for determining a transmission timing so as to transmit a feedback signal at an early timing.

One exemplary embodiment of the present invention provides a method for retransmission in either one of a terminal and a base station, the method including: receiving a data burst transmitted by occupying at least one subframe from the other one of the terminal and the base station; determining a transmission timing for transmitting a feedback signal based on a value, determined by transmission information of the data burst including the number of subframes occupied by the data burst, and a frame offset; transmitting the feedback signal to the other one of the terminal and the base station at the transmission timing; and if an NACK message is included in the feedback signal, receiving the data burst retransmitted from the other one of the terminal and the base station.

The transmission information of the data burst may further include a subframe index and the number of subframes included in one frame.

The determining of the transmission timing may include determining a frame index including the transmission timing based on the sum of the value determined by the transmission information of the data burst and the frame offset.

In the determining of the frame index, the frame index including the transmission timing may be determined based on a timing spaced apart by the sum from the frame index in which the data burst has been transmitted.

If the terminal transmits the feedback signal, the frame index including the transmission timing may be determined as $$\left(i' + \text{floor}\left(\frac{\text{ceil}(m' + F/2 + N_{TTI} - m_F)}{F}\right) + z'\right) \bmod N,$$

wherein i' may denote the frame index in which the data burst has been transmitted, m' may denote the subframe index in which the data burst has been transmitted, $N_{TTI}$ may denote the number of subframes occupied by the data burst, F may denote the number of frames included in one subframe, $m_F$ may denote a subframe index offset determined by the start value of the subframe index, and z' may denote the frame offset.

If the base station transmits the feedback signal, the frame index including the transmission timing may be determined as $$\left(j' + \text{floor}\left(\frac{\text{ceil}(m' + F/2 + N_{TTI} - m_F)}{F}\right) + w'\right) \bmod N,$$

wherein j' may denote the frame index in which the data burst has been transmitted, m' may denote the subframe index in which the data burst has been transmitted, $N_{TTI}$ may denote the number of subframes occupied by the data burst, F may denote the number of frames included in one subframe, $m_F$ may denote a subframe index offset determined by the start value of subframe index, and w' may denote the frame offset.

The determining of the transmission timing may further include determining a subframe index including the transmission timing based on a value determined by the transmission information of the data burst.

The subframe index including the transmission timing may be determined as ceil(m'+F/2+$N_{TTI}$-$m_F$)modF, and m' may denote the subframe index in which the data burst has been transmitted, $N_{TTI}$ may denote the number of subframes occupied by the data burst, F may denote the number of frames included in one subframe, and $m_F$ may denote a subframe index offset determined by the start value of subframe index.

The frame offset may have a value of 0 or 1 depending on the relationship between the number of subframes required to process the data burst and the number of subframes included in one frame.

Another exemplary embodiment of the present invention provides a method for retransmission in a terminal, the method including: transmitting a data burst to a base station; receiving a feedback signal including an NACK message from the base station; determining a retransmission timing based on a value determined by transmission information of the data burst including the number of subframes occupied by the data burst and a frame offset; and retransmitting the data burst to the base station at the retransmission timing.

The transmission information of the data burst may further include a subframe index and the number of subframes included in one frame.

The value determined by the transmission information of the data burst may represent a different number of subframes occupied by the data burst depending on whether the number of subframes included in one frame is an odd number or even number.

The determining of the retransmission timing may include: determining the index of the subframe in which the data burst has been transmitted as the subframe index to be retransmitted; and determining the frame index to be retransmitted based on the sum of the value determined by the transmission information of the data burst and the frame offset.

In the determining of the frame index to be retransmitted, the frame index to be retransmitted may be determined based on a timing spaced apart by the sum from the frame index in which the feedback signal has been transmitted.

The frame index to be retransmitted may be determined as $$\left(k' + \text{floor}\left(\frac{\text{ceil}(n' + K + F/2)}{F}\right) + v'\right) \bmod N,$$

and if the number of subframes included in one frame is an odd number, K may be [F−($N_{TTI}$−$m_F$+1)], and if the number of subframes included in one frame is an even number, K may be [F−($N_{TTI}$−$m_F$)], wherein k' may denote the subframe index in which the feedback signal has been transmitted, n' may denote the subframe index in which the feedback signal has been transmitted, $N_{TTI}$ may denote the number of subframes occupied by the data burst, F may denote the number of subframes included in one frame, N may denote the number of frames included in one superframe, $m_F$ may denote a subframe index offset determined by the start value of the subframe index, and v' may denote the frame offset.

The frame offset may have a value of 0 or 1 depending on the relationship between the number of subframes required to process the data burst and the number of subframes included in one frame.

Still another exemplary embodiment of the present invention provides a method for retransmission in either one of a terminal and a base station, the apparatus including: a receiver for receiving a data burst transmitted by occupying at least one subframe or a feedback signal for a transmitted data burst from the other one of the terminal and the base station; a transmitter for transmitting a feedback signal for the received data burst or retransmitting the transmitted data burst based on the received feedback signal to the other one of the terminal and the base station; and a transmission timing determiner for determining a transmission timing of the feedback signal and a retransmission timing of the data burst, wherein the retransmission timing determiner determines the transmission timing of the feedback signal based on transmission information of the received data burst including the number of subframes occupied by the received data burst, and determines the retransmission timing based on the transmission information of the data burst to be retransmitted including the number of subframes occupied by the data burst to be retransmitted.

The transmission timing determiner may determine the transmission timing of the feedback signal based on a value determined by the transmission information of the received data burst and a frame offset.

The transmission timing determiner may determine the retransmission timing based on the value determined by the transmission information of the data burst to be retransmitted and a frame offset.

According to the exemplary embodiments of the present invention, the performance of the retransmission apparatus can be improved by performing an operation associated with retransmission at an early timing.

DETAILED DESCRIPTION OF THE EMBODIMENTS

Figure 1:
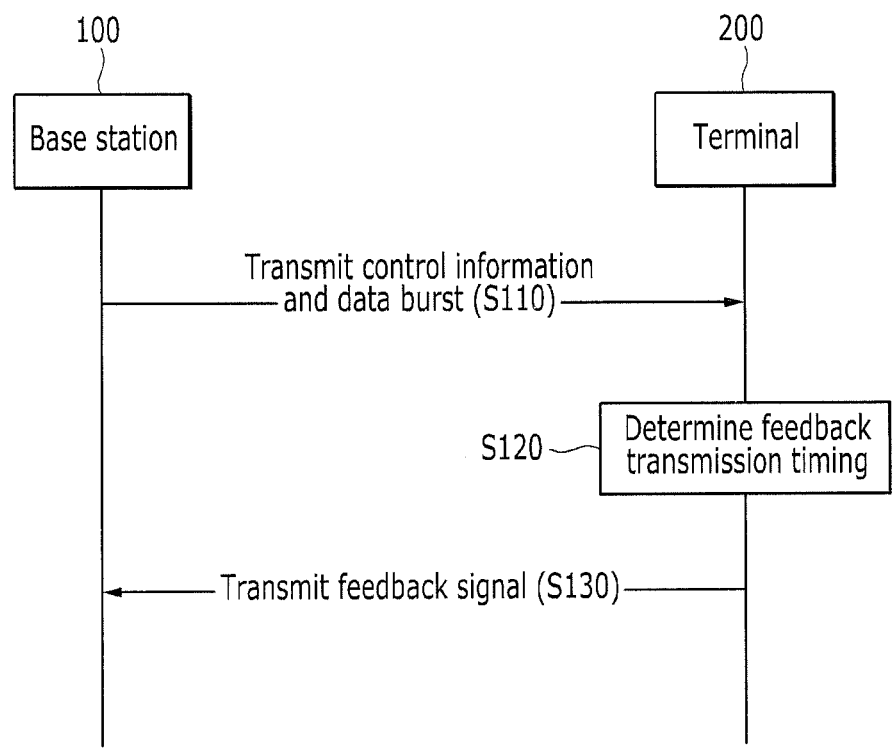
FIG. 1 is a flowchart schematically showing a downlink HARQ operation according to one exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a terminal (UE) may designate a mobile station (MS), a mobile terminal (MT), a subscriber station (SS), a portable subscriber station (PSS), user equipment (UE), an access terminal (AT), etc., and may include the entire or partial functions of the mobile terminal, the subscriber station, the portable subscriber station, the user equipment, etc.

In this specification, a base station (BS) may designate an access point (AP), a radio access station (RAS), a Node B, an evolved node B (eNodeB), a base transceiver station (BTS), a mobile multihop relay (MMR)-BS, etc., and may include the entire or partial functions of the access point, the radio access station, the node B, the base transceiver station, the MMR-BS, etc.

Now, a retransmission method according to an exemplary embodiment of the present invention will be described in detail with reference to the accompanying drawings by taking an HARQ scheme as an example.

Figure 2:
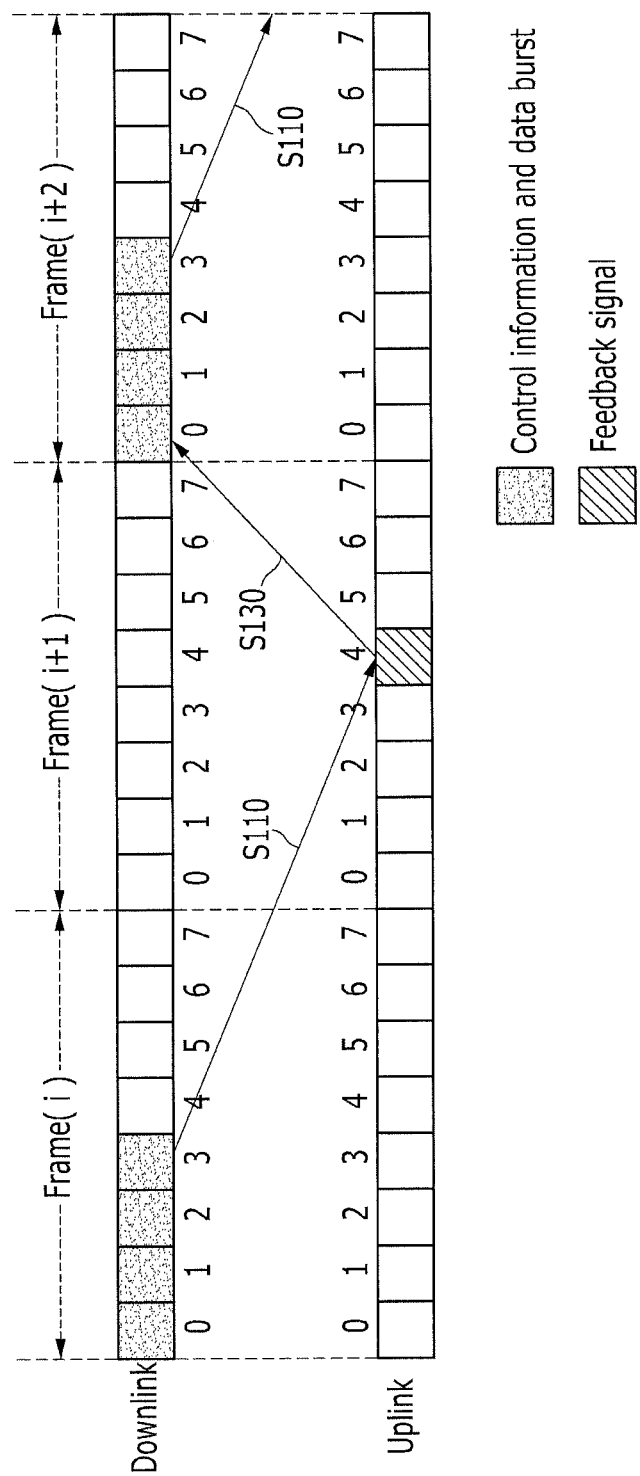
FIG. 2 is a view showing a downlink HARQ transmission timing according to one exemplary embodiment of the present invention.

FIG. 1 is a flowchart schematically showing a downlink HARQ operation according to one exemplary embodiment of the present invention. FIG. 2 is a view showing a downlink HARQ transmission timing according to one exemplary embodiment of the present invention.

First, referring to FIG. 1, a base station 100 transmits control information including resource allocation information and a data burst (S110). At this time, it is assumed that the control information and the data burst are transmitted using a subframe with index 'm' (hereinafter, referred to as a subframe m) in a frame with index T (hereinafter, referred to as a frame i). Frame indices may be indices 0 to N−1 given in the order of frames when N frames are included in a superframe. Subframe indices may be given in the order of subframes when F subframes are included in one frame. For example, if the start value of the subframe indices is 0, the subframe indices may be indices 0 to F−1.

A terminal 200 having received the control information and the data burst determines a subframe n of a frame j for transmitting a feedback signal (S120), and transmits a feedback signal to the base station 100 (S130). The terminal 200 can obtain the indices j and n of the frame and subframe corresponding to a transmission timing of the feedback signal by Equations 1 to 3. At this time, z is a frame offset used to determine a frame index, and has a value of 0 or 1.

$$j = \left(i + \text{floor}\left(\frac{\text{ceil}(m + F/2)}{F}\right) + z\right) \bmod N \qquad \text{(Equation 1)}$$

$$z = \begin{cases} 0, & \text{if } (\text{ceil}(F/2) - N_{TTI} \geq T_{proc} \\ 1, & \text{else} \end{cases} \qquad \text{(Equation 2)}$$

$$n = \text{ceil}(m + F/2) \bmod F \qquad \text{(Equation 3)}$$

In Equation 1 to Equation 3, the ceil function is a function for returning the closest integer greater than or equal to a corresponding value, the floor function is a function for returning the closest integer greater than or equal to a corresponding value, and the mod function is a function for performing a modular operation. N denotes the number of frames included in a superframe, and F denotes the number of subframes included in one frame. $N_{TTI}$ is a transmission time interval (TTI) value which denotes the number of subframes occupied by a data burst, and $T_{proc}$ is the processing time required to process the data burst which is expressed in units of subframes.

Next, referring to FIGS. 1 and 2, an HARQ operation in a Frequency Division Duplexing (FDD) mode is performed using downlink (DL) and uplink (UL) frames. Hereinbelow, an HARQ operation is assumed in which eight subframes (i.e., F=8) are included in one frame, the respective subframes have indices 0 to 7, a data burst is transmitted during four subframes (i.e., $N_{TTI}$=4), and the processing time required to process the data burst corresponds to three subframes (i.e., $T_{proc}$=3).

When the base station 100 transmits control information and a data burst using four subframes starting from a subframe 0 of a downlink frame i (S110), the terminal 200 transmits a feedback signal in a subframe 4 of an uplink frame i+1 determined by using Equations 1 to 3 (S130). If the base station 100 receives an NACK message, the base station 100 can arbitrarily determine a retransmission. For example, the base station 100 can retransmit in the same subframe 0 as previously used for transmission (S110).

Figure 3:
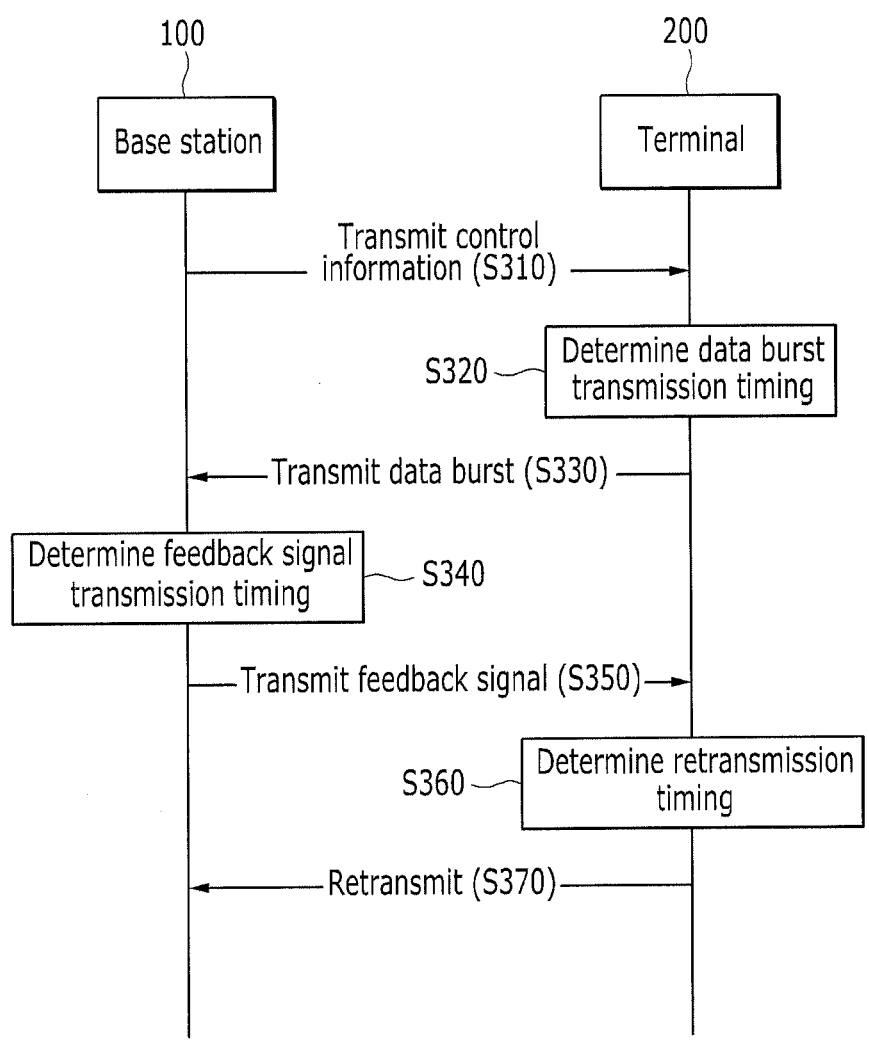
FIG. 3 is a flowchart schematically showing an uplink HARQ operation according to one exemplary embodiment of the present invention.
Figure 4:
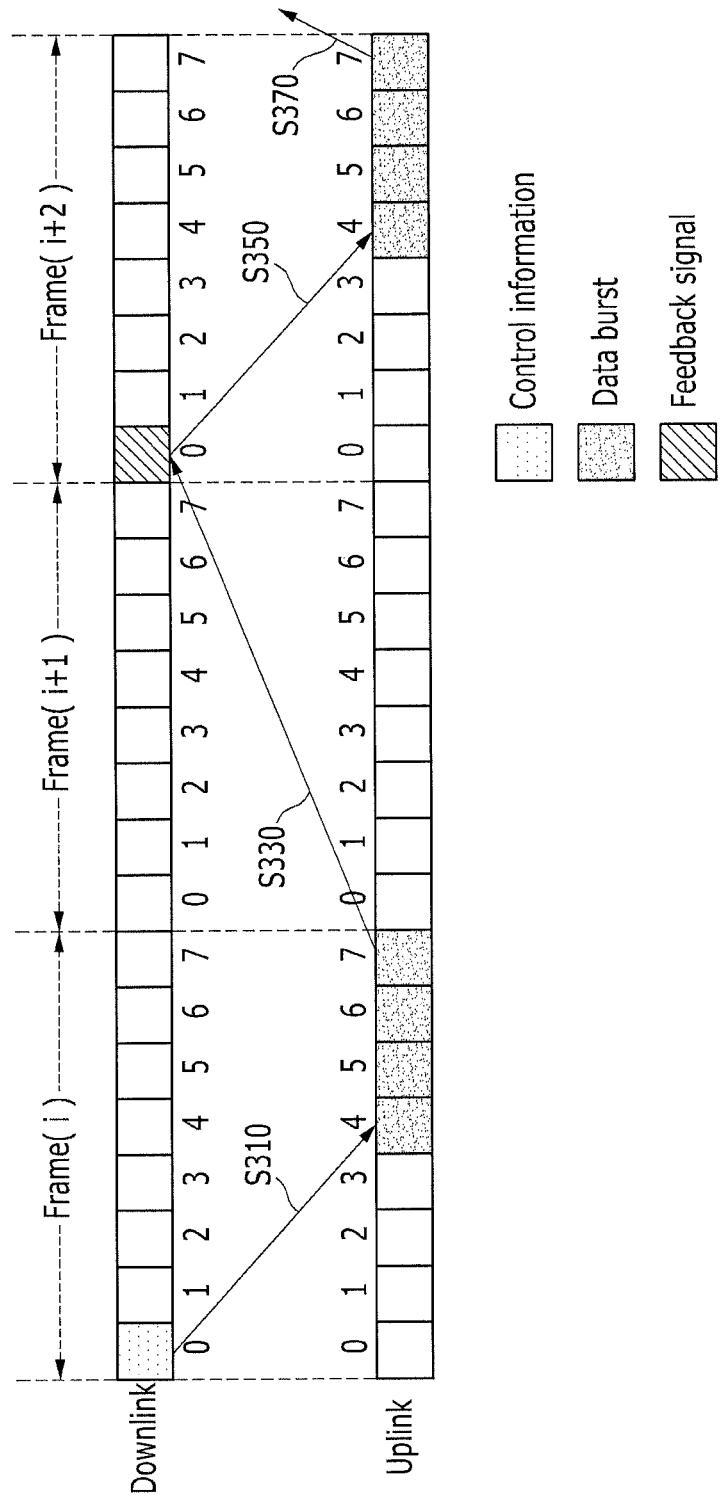
FIG. 4 is a view showing an uplink HARQ transmission timing according to one exemplary embodiment of the present invention.

FIG. 3 is a flowchart schematically showing an uplink HARQ operation according to one exemplary embodiment of the present invention. FIG. 4 is a view showing an uplink HARQ transmission timing according to one exemplary embodiment of the present invention.

First, referring to FIG. 3, the base station 100 transmits control information including resource allocation information in a subframe I of the frame i (S310).

The terminal 200 having received the control information determines a frame j and a subframe m corresponding to a transmitting timing of a data burst (S320), and transmits the data burst to the base station 100 (S330). The indices j and m of the frame and subframe corresponding to the timing at which the terminal 200 transmits the data burst can be obtained by Equations 4 to 6. v is a frame offset, and has a value of 0 or 1.

$$j = \left(i + \text{floor}\left(\frac{\text{ceil}(l + F/2)}{F}\right) + v\right) \bmod N \quad \text{(Equation 4)}$$

$$v = \begin{cases} 0, & \text{if } ((\text{ceil}(F/2) - 1) \geq T_{proc}) \\ 1, & \text{else} \end{cases} \quad \text{(Equation 5)}$$

$$m = \text{ceil}(l + F/2) \bmod F \quad \text{(Equation 6)}$$

The base station 100 having received the data burst determines a subframe n of a frame k corresponding to a transmitting timing of a feedback signal including an ACK or NACK message (S340), and transmits the feedback signal to the terminal 200 (S350). The index k of the frame in which the base station 100 transmits the feedback signal can be obtained by using Equations 7 and 8, and the index n of the subframe can be determined to be equal to the index I of the subframe in which the control information has been transmitted. w is a frame offset, and has a value of 0 or 1.

$$k = \left(j + \text{floor}\left(\frac{m + F/2}{F}\right) + w\right) \bmod N \quad \text{(Equation 7)}$$

$$w = \begin{cases} 0, & \text{if } ((\text{floor}(F/2) - N_{TTI}) \geq T_{proc}) \\ 1, & \text{else} \end{cases} \quad \text{(Equation 8)}$$

If the feedback signal received by the terminal 200 is an NACK message, the terminal 200 determines a frame p corresponding to a retransmission timing of the data burst (S360), and retransmits the data burst to the base station 100 (S370). The terminal 200 retransmits at the position of the subframe m previously used for data burst transmission in the determined frame p by using Equations 5 and 9.

$$p = \left(k + \text{floor}\left(\frac{\text{ceil}(l + F/2)}{F}\right) + v\right) \bmod N \quad \text{(Equation 9)}$$

Next, referring to FIGS. 3 and 4, when the base station 100 transmits control information in the subframe 0 of the downlink frame i (S310), the terminal 200 occupies at least one subframe, e.g., four subframes, starting from a subframe 4 of an uplink frame i determined by using Equations 4 to 6, and transmits a data burst (S330). The base station 100 having received the data burst transmits a feedback signal in the subframe 0 previously used for transmitting the control information in a downlink frame i+2 determined by Equation 7 and Equation 8 (S350). If the terminal 200 receives an NACK message, the terminal 200 retransmits by occupying frames, starting from the subframe 4 previously used for transmitting the data burst, in an uplink frame i+2 determined by using Equations 5 and 9 (S370).

As discussed above, in FIG. 2, it is not until a subframe 4 of a downlink frame i+1 that the terminal 200 can start to transmit a feedback signal. Accordingly, when the terminal 200 transmits a feedback signal including an NACK message, retransmission performed by the base station 100 having received the feedback signal is delayed as well. Also, even if the terminal 100 transmits a feedback signal including an ACK message, it is not after the subframe 4 of the uplink frame i+1 that buffers of various blocks used for the HARQ operation, e.g., an HARQ (FEC) block, an ARQ block, and a block used for data burst transmission, can be deleted. Likewise, in FIG. 4, it is not until the uplink frame i+2 that the base station 100 can transmit a feedback signal. As a result, the HARQ operation may be delayed, and the timing of deletion of the blocks used for the HARQ operation may be delayed.

Next, a transmission timing determination method for a fast HARQ operation will be described.

Figure 5:
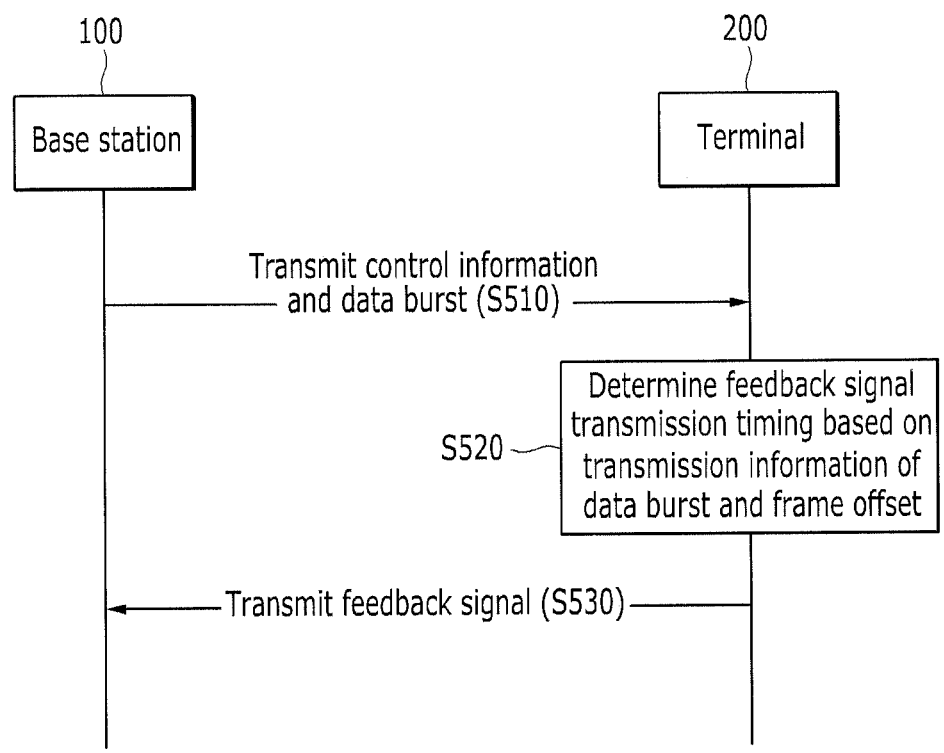
FIG. 5 is a flowchart schematically showing a downlink HARQ operation according to another exemplary embodiment of the present invention.
Figure 6:
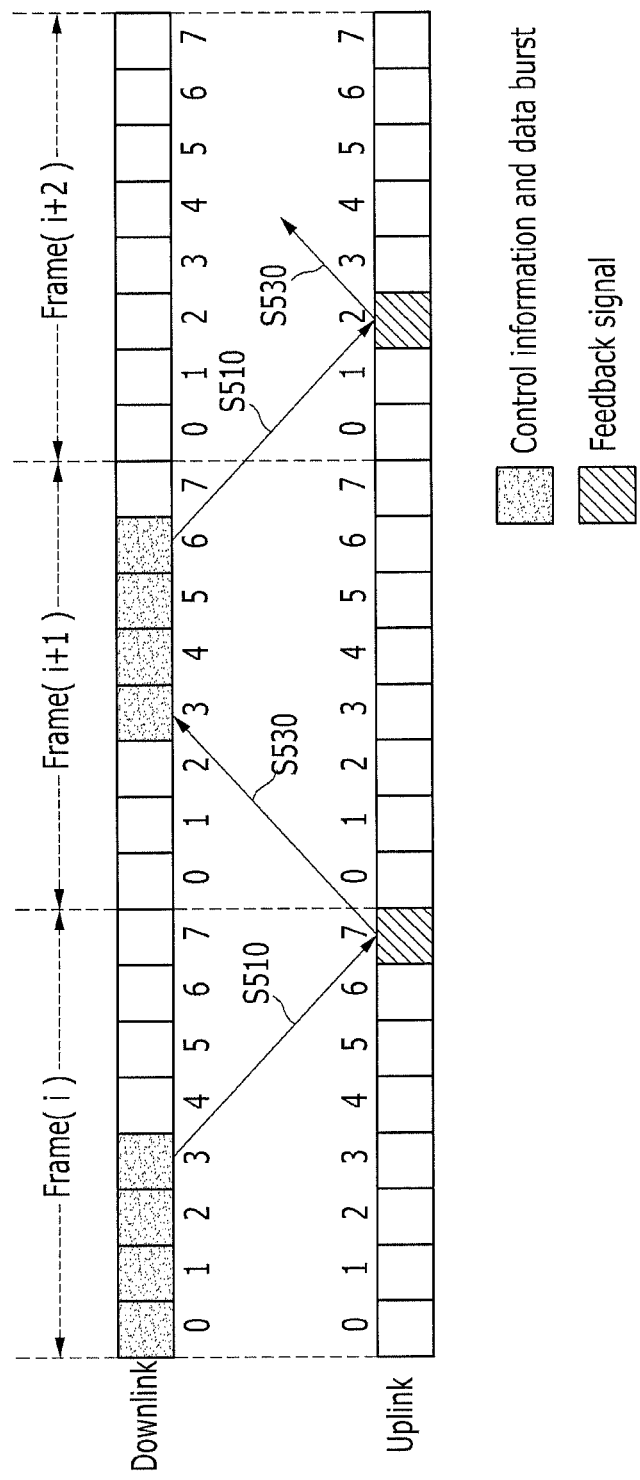
FIG. 6 is a view showing a downlink HARQ transmission timing according to another exemplary embodiment of the present invention.

FIG. 5 is a flowchart schematically showing a downlink HARQ operation according to another exemplary embodiment of the present invention. FIG. 6 is a view showing a downlink HARQ transmission timing according to another exemplary embodiment of the present invention.

First, referring to FIG. 5, a base station 100 transmits control information including resource allocation information and a data burst by occupying at least one subframe from subframe m' of a downlink frame i' (S510).

A terminal 200 having received the control information and the data burst determines a frame j' and subframe n' for transmitting a feedback signal based on a value determined by transmission information of the data burst and a frame offset z' (S520). The transmission information of the data burst comprises the number $N_{TTI}$ of subframes occupied by the data burst, the subframe index m' in which the data burst has been transmitted, and the number F of subframes included in one frame. The indices j' and n' of the frame and subframe for transmitting a feedback signal are determined as in Equations 10 to 12.

$$j' = \left(i' + \text{floor}\left(\frac{\text{ceil}(m' + F/2 + N_{TTI} - m_F)}{F}\right) + z'\right) \bmod N \quad \text{(Equation 10)}$$

$$z' = \begin{cases} 0, & \text{if } (\text{ceil}(F/2) - m_F \geq T_{proc}) \\ 1, & \text{else} \end{cases} \quad \text{(Equation 11)}$$

$$n' = \text{ceil}(m' + F/2 + N_{TTI} - m_F) \bmod F \quad \text{(Equation 12)}$$

The transmission information of the data burst further comprises a subframe index offset $m_F$. The subframe index offset $m_F$ serves to adjust a value returned by the ceil function according to the start value of the subframe index, and the subframe index offset $m_F$ is determined such that the sum of the start value of the subframe index and the subframe index offset $m_F$ becomes 1. For example, if the subframe indices start from 0, the subframe index offset $m_F$ is 1, and if the subframe indices start from 1, the subframe index offset $m_F$ is set to 0.

The terminal 200 transmits a feedback signal at a transmission timing determined by using Equations 10 to 12 (S530). After that, if the base station 100 receives an NACK message, the HARQ operation for transmitting and receiving a data burst and a feedback signal may be repeated.

A downlink HARQ transmission timing using Equations 12 to 12 is given in Table 1.

TABLE 1

| content | subframe index | frame index |
|---|---|---|
| Control information transmission | l | i' |
| Data burst transmission | m' = l | i' |
| feedback signal transmission | n' = ceil(m' + F/2 + $N_{TTI}$ − $m_F$) mod F | $j' = \left(i' + \text{floor}\left(\frac{\text{ceil}(m' + F/2 + N_{TTI} - m_F)}{F}\right) + z'\right) \bmod N$ <br> Where <br> $z' = \begin{cases} 0, & \text{if } (\text{ceil}(F/2) - m_F \geq T_{proc}) \\ 1, & \text{else} \end{cases}$ |

Next, referring to FIGS. 5 and 6, when the base station 100 occupies four subframes starting from a subframe 0 of a downlink frame i, (i.e., $N_{TTI}$=4), and transmits control information and a data burst (S510), the terminal 200 having received the data burst transmitted by the base station 100 transmits a feedback signal in a subframe 7 of an uplink frame i determined by using Equations 10 to 12 (S530). If the base station 100 receives an NACK message, the base station 100 can arbitrarily determine a retransmission timing depending on available resources. For example, the base station 100 retransmits starting from a subframe 3 of a downlink frame i+1 determined by using Equations 10 to 12 with reference to the transmission timing of the feedback signal.

When comparing FIG. 6 with FIG. 2, it can be seen that, if the number $N_{TTI}$ of subframes occupied by the data burst is taken into account when the terminal 200 determines the transmission timing of the feedback signal, the transmission timing of the feedback signal becomes earlier. As a result, the feedback signal can be sent earlier by a margin equal to the length obtained by subtracting the ($N_{TTI}$−$m_F$) component from the number F of subframes. Particularly, when the subframe index offset $m_F$ is 1, the method for determining a transmission timing based on Equations 10 to 12 performs a feedback procedure at a position earlier than the method of determining a transmission timing based on Equations 1 to 3 by a margin corresponding to an [F−(NTTI−mF)] number of frames, i.e., an (F−NTTI+1) number of subframes.

Figure 7:
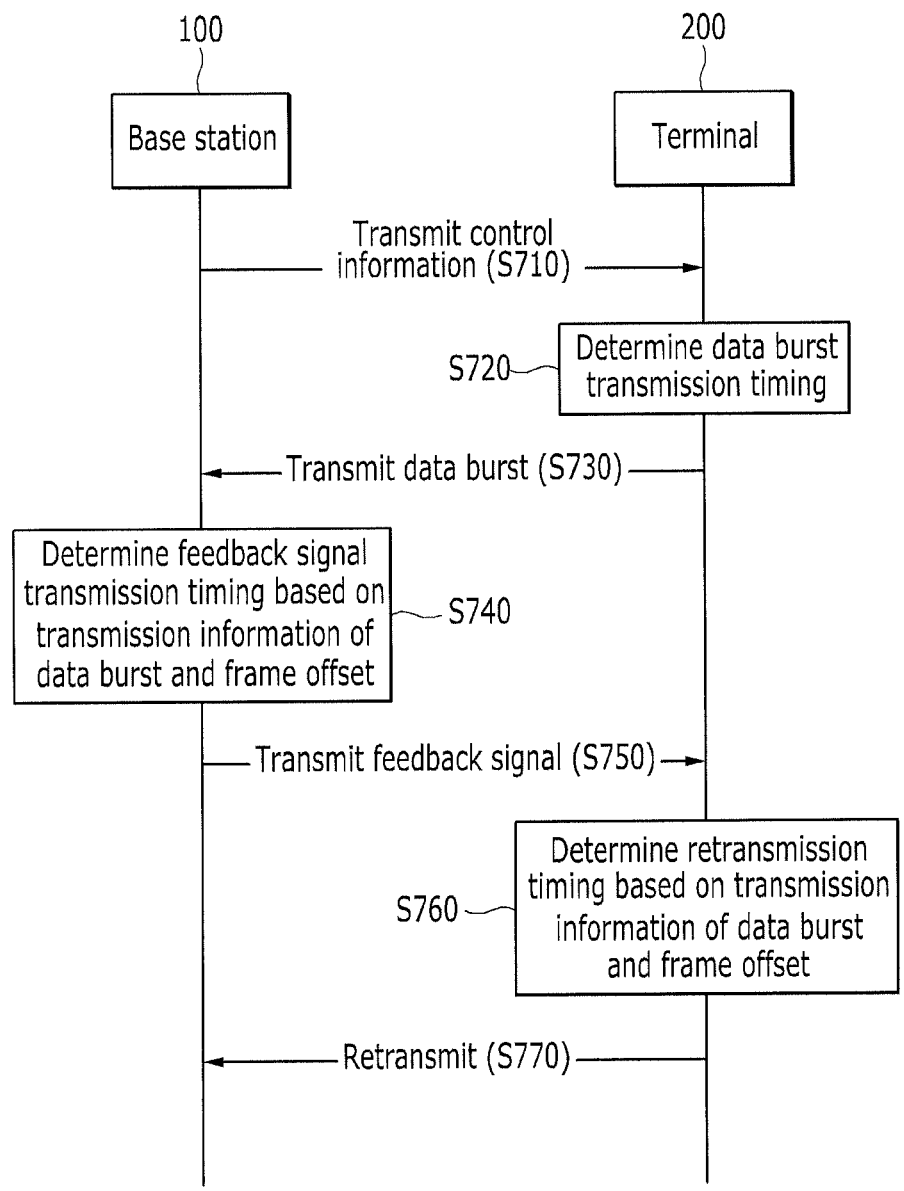
FIG. 7 is a flowchart schematically showing an uplink HARQ operation according to another exemplary embodiment of the present invention.
Figure 8:
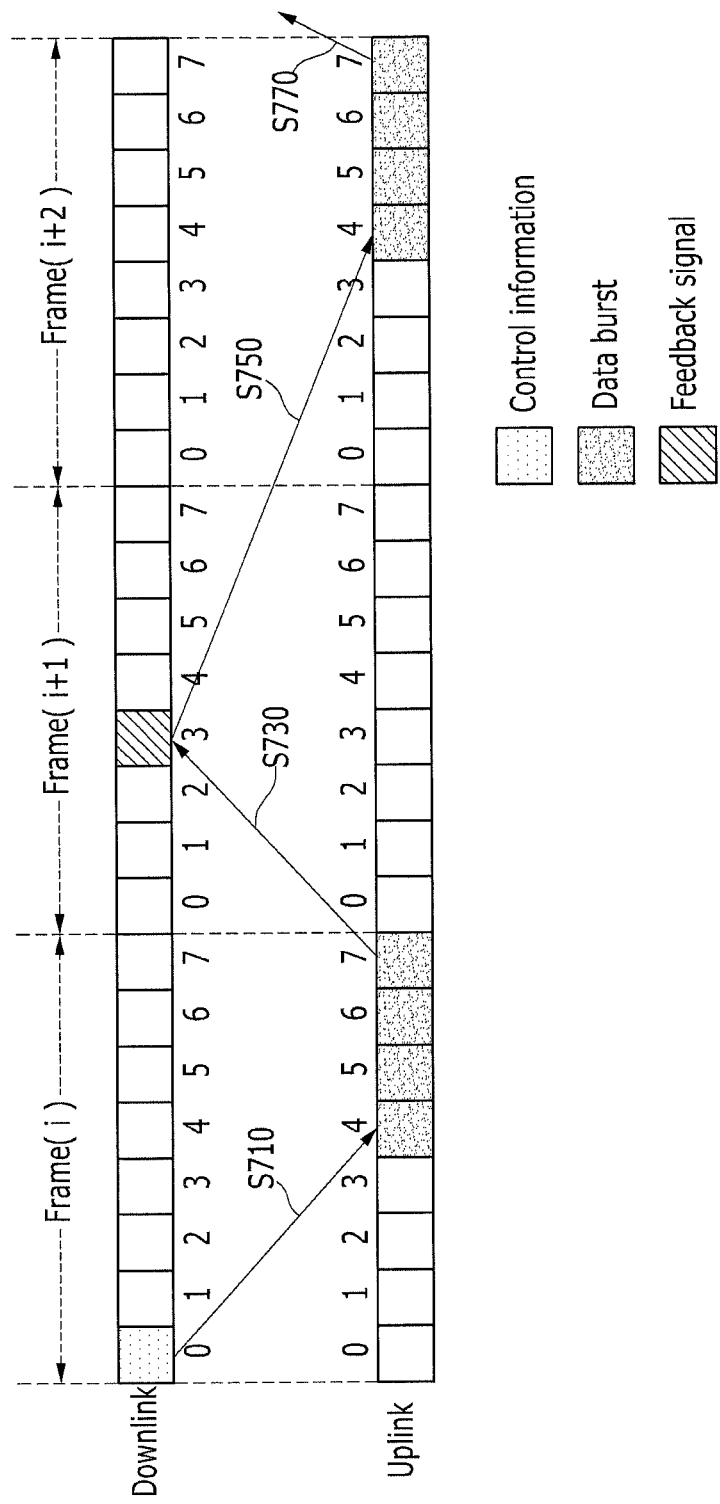
FIG. 8 is a view showing an uplink HARQ transmission timing according to another exemplary embodiment of the present invention.

FIG. 7 is a flowchart schematically showing an uplink HARQ operation according to another exemplary embodiment of the present invention. FIG. 8 is a view showing an uplink HARQ transmission timing according to another exemplary embodiment of the present invention.

First, referring to FIG. 7, a base station 100 transmits control information including resource allocation information in a subframe l' of a frame i' (S710).

A terminal 200 having received the control information determines a frame j' and subframe m' corresponding to a data burst transmission timing (S720), and transmits a data burst at the corresponding timing (S730). In determining the indices of the frame j' and subframe m' for transmitting the data burst, the terminal 200 uses Equations 13 to 15 by using the frame i' and subframe l' corresponding to the transmission timing of the control information as the reference timing. v' is a frame offset, which can be obtained in the same Equation as z' of Equation 11.

$$j' = \left(i' + \text{floor}\left(\frac{\text{ceil}(l' + F/2)}{F}\right) + v'\right) \bmod N \quad \text{(Equation 13)}$$

$$v' = \begin{cases} 0, & \text{if } ((\text{ceil}(F/2) - 1) \geq T_{proc}) \\ 1, & \text{else} \end{cases} \quad \text{(Equation 14)}$$

$$m' = \text{ceil}(l' + F/2) \bmod F \quad \text{(Equation 15)}$$

Next, the base station 100 having received the data burst determines a subframe n' of a frame k' for transmitting a feedback signal based on a value determined by transmission information of the data burst and a frame offset w' (S740). The transmission information of the data burst comprises the number $N_{TTI}$ of subframes occupied by the data burst, the subframe index m' in which the data burst has been transmitted, the number F of subframes included in one frame, and the subframe index offset $m_F$. The indices k' and n' of the frame and subframe for transmitting a feedback signal are determined as shown in Equations 16 and 17, and the frame offset w' is determined by the same Equation 14 as the frame offset v'. The subframe index offset $m_F$ has a value determined by the start value of the subframe index.

$$k' = \left(j' + \text{floor}\left(\frac{\text{ceil}(m' + F/2 + N_{TTI} - m_F)}{F}\right) + w'\right) \bmod N \quad \text{(Equation 16)}$$

$$n' = \text{ceil}(m' + F/2 + N_{TTI} - m_F) \bmod F \quad \text{(Equation 17)}$$

The base station 100 transmits a feedback signal at a determined transmission timing (S750).

If the feedback signal received by the terminal 200 is an NACK message, the terminal 200 determines a frame p' corresponding to a retransmission timing of the data burst based on the value determined by the transmission information of the data burst and the frame offset v' (S760), and retransmits it to the base station 100 (S770). The index p' of the frame to be retransmitted is determined by using Equations 14 to 18. A subframe to be retransmitted may be determined to be identical to the subframe m' in which the data burst has been previously transmitted.

$$p' = \left(k' + \text{floor}\left(\frac{\text{ceil}(n' + K + F/2)}{F}\right) + v'\right) \bmod N \quad \text{(Equation 18)}$$

In Equation 18, if the data burst is transmitted in one subframe, K is defined as 0, and if the data burst is transmitted in a plurality of subframes, K is defined as a value of [F−(NTTI−mF+1)] and a value of [F−(NTTI−mF)] depending on whether the number F of subframes is an odd number or even number.

An uplink HARQ transmission timing using Equations 13 to 18 is given in Table 2.

TABLE 2

| content | subframe index | frame index |
|---|---|---|
| Control information transmission | l' | i' |
| Data burst transmission | m' = ceil(l' + F/2)mod F | $j' = \left(i' + \text{floor}\left(\frac{\text{ceil}(l' + F/2)}{F}\right) + v'\right) \bmod N$ where $v' = \begin{cases} 0, & \text{if } ((\text{ceil}(F/2) - 1) \geq T_{proc}) \\ 1, & \text{else} \end{cases}$ |
| feedback signal transmission | n' = ceil(m' + F/2 + $N_{TTI}$ − $m_F$)mod F | $k' = \left(j' + \text{floor}\left(\frac{\text{ceil}(m' + F/2 + N_{TTI} - m_F)}{F}\right) + w'\right) \bmod N$ where w' = v' |
| retransmission | m' | $p' = \left(k' + \text{floor}\left(\frac{\text{ceil}(n' + K + F/2)}{F}\right) + v'\right) \bmod N$ |

Next, referring to FIGS. 7 and 8, when the base station 100 transmits control information in a subframe 0 of a downlink frame i (S710), the terminal 200 occupies subframes for a data burst starting from a subframe 4 of an uplink frame i determined by using Equations 13 to 15 and transmits a data burst (S730).

The base station 100 having received the data burst transmits a feedback signal in a subframe 3 of a frame i+1 determined by using Equations 17 to 19 (S850). The terminal 200 having received an NACK message occupies subframes starting from a subframe 4 of an uplink frame i+2 determined by using Equations 14 to 18, and retransmits the data burst (S770).

As a result, the feedback signal can be sent earlier by a margin equal to the length obtained by subtracting the ($N_{TTI}$−$m_F$) component from the number F of subframes. Particularly, when comparing FIG. 6 with FIG. 2 when the subframe index offset $m_F$ is 1, if the number $N_{TTI}$ of subframes occupied by the data burst is taken into account when the base station 100 determines the transmission timing of the feedback signal, a feedback procedure is performed at a position earlier by a margin corresponding to an [F−($N_{TTI}$−$m_F$)] number of frames, i.e., an (F−$N_{TTI}$+1) number of subframes.

Next, a retransmission apparatus performing the retransmission method according to one exemplary embodiment of the present invention will be described with reference to FIG. 9.

Figure 9:
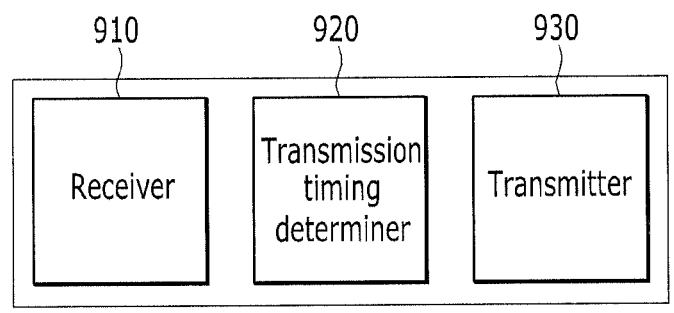
FIG. 9 is a schematic block diagram of a retransmission apparatus according to one exemplary embodiment of the present invention.

FIG. 9 is a schematic block diagram of a retransmission apparatus according to one exemplary embodiment of the present invention.

Referring to FIG. 9, the retransmission apparatus comprises a receiver 910, a transmission timing determiner 920, and a transmitter 930. The retransmission apparatus may be formed in a terminal or base station.

If the retransmission apparatus is formed in the terminal, the receiver 910 receives a data burst from the base station, and the transmission timing determiner 920 determines a frame index and subframe index for transmitting a feedback signal based on the frame index and subframe index in which the received data burst has been previously transmitted, the number of subframes occupied by the data burst, and so forth as explained above. Then, the transmitter 930 transmits a feedback signal to the base station in the determined frame index and subframe index. Alternatively, the transmitter 930 transmits a data burst to the base station, and the receiver 910 receives a feedback signal for the transmitted data burst to the base station from the base station. If the receiver 910 receives a feedback signal including an NACK message, the transmission timing determiner 920 determines a retransmission timing. Then, the transmitter 930 retransmits the data burst to the base station at the determined timing.

If the retransmission apparatus is formed in the base station, the receiver 910 receives a data burst from the terminal, and the transmission timing determiner 920 determines a frame index and subframe index for transmitting a feedback signal based on the frame index and subframe index in which the received data burst has been previously transmitted, the number of subframes occupied by the data burst, and so forth as explained above. Then, the transmitter 930 transmits a feedback signal to the terminal in the determined frame index and subframe index. Alternatively, the transmitter 930 transmits a data burst to the terminal, and the receiver 910 receives a feedback signal for the transmitted data burst to the base station. If the receiver 910 receives a feedback signal including an NACK message from the terminal, the transmission timing determiner 920 determines a retransmission timing, and the transmitter 930 retransmits the data burst at the determined retransmission timing.

As such, according to the present invention, if the base station 100 or the terminal 200 determines a transmission timing based on the transmission information of the data burst including the number $N_{TTI}$ of subframes occupied by the data burst, the feedback signal can be transmitted at an early timing. Therefore, the standby time of a buffer included in an HARQ (FEC) block, an ARQ block, or a block used for data burst transmission can be reduced, and as a result, can reduce the size of the system buffer. Also, the exemplary embodiments of the present invention are applicable in the same way even when the number F of subframes included in one frame has a value other than 8, for example, 5, 6, or 7.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for retransmission in either one of a terminal and a base station, the method comprising:
   receiving a data burst transmitted by occupying at least one subframe from the other one of the terminal and the base station;
   determining a transmission timing for transmitting a feedback signal based on a value, determined by transmission information of the data burst including the number of subframes occupied by the data burst, and a frame offset;
   transmitting the feedback signal to the other one of the terminal and the base station at the transmission timing; and
   if an NACK message is included in the feedback signal, receiving the data burst retransmitted from the other one of the terminal and the base station,
   wherein the determining of the transmission timing further comprises determining a frame index including the transmission timing based on the sum of the value determined by the transmission information of the data burst and the frame offset.

2. The method of claim 1, wherein, in the determining of the frame index, the frame index including the transmission timing is determined based on a timing spaced apart by the sum from the frame index in which the data burst has been transmitted.

3. The method of claim 2, wherein,
   if the terminal transmits the feedback signal,
   the frame index including the transmission timing is determined as $$\left(i' + \text{floor}\left(\frac{\text{ceil}(m' + F/2 + N_{TTI} - m_F)}{F}\right) + z'\right) \bmod N,$$

wherein i' denotes the frame index in which the data burst has been transmitted, m' denotes the subframe index in which the data burst has been transmitted, $N_{TTI}$ denotes the number of subframes occupied by the data burst, F denotes the number of frames included in one subframe, $m_F$ denotes a subframe index offset determined by the start value of the subframe index, and z' denotes the frame offset.

4. The method of claim 2, wherein,
   if the base station transmits the feedback signal,
   the frame index including the transmission timing is determined as $$\left(j' + \text{floor}\left(\frac{\text{ceil}(m' + F/2 + N_{TTI} - m_F)}{F}\right) + w'\right) \bmod N,$$

wherein j' denotes the frame index in which the data burst has been transmitted, m' denotes the subframe index in which the data burst has been transmitted, $N_{TTI}$ denotes the number of subframes occupied by the data burst, F denotes the number of frames included in one subframe, $m_F$ denotes a subframe index offset determined by the start value of subframe index, and w' denotes the frame offset.

5. The method of claim 4, wherein the subframe index including the transmission timing is determined as $\text{ceil}(m' + F/2 + N_{TTI} - M_F) \bmod F$, and
   m' denotes the subframe index in which the data burst has been transmitted, $N_{TTI}$ denotes the number of subframes occupied by the data burst, F denotes the number of frames included in one subframe, and $m_F$ denotes a subframe index offset determined by the start value of subframe index.

6. The method of claim 1, wherein, the determining of the transmission timing further comprises determining a subframe index including the transmission timing based on a value determined by the transmission information of the data burst.

7. A method for retransmission in either one of a terminal and a base station, the method comprising:
   receiving a data burst transmitted by occupying at least one subframe from the other one of the terminal and the base station;
   determining a transmission timing for transmitting a feedback signal based on a value, determined by transmission information of the data burst including the number of subframes occupied by the data burst, and a frame offset;
   transmitting the feedback signal to the other one of the terminal and the base station at the transmission timing; and
   if an NACK message is included in the feedback signal, receiving the data burst retransmitted from the other one of the terminal and the base station,
   wherein the frame offset has a value of 0 or 1 depending on the relationship between the number of subframes required to process the data burst and the number of subframes included in one frame.

8. A method for retransmission in a terminal, the method comprising:
   transmitting a data burst to a base station;
   receiving a feedback signal including an NACK message from the base station;
   determining a retransmission timing based on a value determined by transmission information of the data burst including the number of subframes occupied by the data burst and a frame offset; and
   retransmitting the data burst to the base station at the retransmission timing,
   wherein the value determined by the transmission information of the data burst represents a different number of subframes occupied by the data burst depending on whether the number of subframes included in one frame is an odd number or even number.

9. A method for retransmission in a terminal, the method comprising:
   transmitting a data burst to a base station;
   receiving a feedback signal including an NACK message from the base station;
   determining a retransmission timing based on a value determined by transmission information of the data burst including the number of subframes occupied by the data burst and a frame offset; and
   retransmitting the data burst to the base station at the retransmission timing, wherein the determining of the retransmission timing comprises:
   determining the index of the subframe in which the data burst has been transmitted as the subframe index to be retransmitted; and determining the frame index to be retransmitted based on the sum of the value determined by the transmission information of the data burst and the frame offset.

10. The method of claim 9, wherein, in the determining of the frame index to be retransmitted, the frame index to be retransmitted is determined based on a timing spaced apart by the sum from the frame index in which the feedback signal has been transmitted.

11. The method of claim 10, wherein the frame index to be retransmitted is determined as $$\left(k' + \text{floor}\left(\frac{\text{ceil}(n' + K + F/2)}{F}\right) + v'\right) \bmod N,$$

and if the number of subframes included in one frame is an odd number, K is $[F-(N_{TTI}-m_F+1)]$, and if the number of subframes included in one frame is an even number, K is $[F-(N_{TTI}-m_F)]$, wherein k' denotes the subframe index in which the feedback signal has been transmitted, n' denotes the subframe index in which the feedback signal has been transmitted, $N_{TTI}$ denotes the number of subframes occupied by the data burst, F denotes the number of subframes included in one frame, N denotes the number of frames included in one superframe, $m_F$ denotes a subframe index offset determined by the start value of the subframe index, and v' denotes the frame offset.

12. A method for retransmission in a terminal, the method comprising:

transmitting a data burst to a base station;

receiving a feedback signal including an NACK message from the base station;

determining a retransmission timing based on a value determined by transmission information of the data burst including the number of subframes occupied by the data burst and a frame offset; and retransmitting the data burst to the base station at the retransmission timing, wherein the frame offset has a value of 0 or 1 depending on the relationship between the number of subframes required to process the data burst and the number of subframes included in one frame.

* * * * *